United States Patent
Yu et al.

(10) Patent No.: US 8,615,605 B2
(45) Date of Patent: Dec. 24, 2013

(54) AUTOMATIC IDENTIFICATION OF TRAVEL AND NON-TRAVEL NETWORK ADDRESSES

(75) Inventors: Fang Yu, Sunnyvale, CA (US); Yinglian Xie, Cupertino, CA (US); Martin Abadi, Palo Alto, CA (US); Stefan Roberts Savage, Carlsbad, CA (US); Geoffrey Michael Voelker, Del Mar, CA (US); Andreas Pitsillidis, La Jolla, CA (US)

(73) Assignee: Microsoft Corporation, Redmond, WA (US)

( * ) Notice: Subject to any disclaimer, the term of this patent is extended or adjusted under 35 U.S.C. 154(b) by 309 days.

(21) Appl. No.: 12/909,839

(22) Filed: Oct. 22, 2010

(65) Prior Publication Data

US 2012/0102169 A1    Apr. 26, 2012

(51) Int. Cl.
     *G06F 15/16*        (2006.01)

(52) U.S. Cl.
     USPC .......................... 709/245; 709/224; 709/226

(58) Field of Classification Search
     USPC ......... 709/201–203, 217–219, 248, 224–229, 709/245; 726/2–10; 705/14.49, 14.5, 14.58
     See application file for complete search history.

(56) References Cited

U.S. PATENT DOCUMENTS

| | | |
|---|---|---|
| 7,310,686 B2 | 12/2007 | Uysal |
| 7,366,919 B1 | 4/2008 | Sobel et al. |
| 7,634,463 B1 | 12/2009 | Katragadda et al. |
| 7,676,566 B2 | 3/2010 | Lund et al. |
| 7,870,297 B1 * | 1/2011 | Linhardt ....................... 709/250 |
| 8,102,860 B2 * | 1/2012 | Amitai et al. ............ 370/395.53 |
| 2002/0016831 A1 | 2/2002 | Peled et al. |
| 2006/0072726 A1 * | 4/2006 | Klein et al. .............. 379/201.01 |
| 2007/0032992 A1 * | 2/2007 | Trowbridge et al. .......... 702/193 |
| 2007/0143827 A1 * | 6/2007 | Nicodemus et al. ............... 726/2 |
| 2007/0143851 A1 * | 6/2007 | Nicodemus et al. ............ 726/25 |
| 2007/0169178 A1 * | 7/2007 | Keohane et al. ................. 726/4 |
| 2007/0192845 A1 * | 8/2007 | Lankheim ...................... 726/12 |

(Continued)

FOREIGN PATENT DOCUMENTS

WO      2008080104 A1      7/2008

OTHER PUBLICATIONS

Laasonen, et al, "Adaptive On-Device Location Recognition," Springer 2004.*

(Continued)

*Primary Examiner* — Patrice Winder
*Assistant Examiner* — Julian Chang
(74) *Attorney, Agent, or Firm* — Microsoft Corporation (57) ABSTRACT

A system to automatically classify types of IP addresses associated with a user. Information, such as user names, machine information, IP address, etc., may be obtained from logs. For each user or host in the logs, home IP addresses are identified from IP addresses where the user or host shows a predetermined level of activity. Travel IP addresses are identified, which are IP addresses at locations greater than a predetermined distance from the home IP addresses, as determined from geolocation data. A pattern analysis may be performed to determine which of the home IP addresses are work IP addresses associated with the user or host. The system may thus provide a classification of a user's or host's associated IP addresses as being one of travel, home, and work IP addresses. From this classification, mobility patterns may be derived, as well as applications to enhance security, advertising, search and network management.

20 Claims, 4 Drawing Sheets

(56) References Cited

U.S. PATENT DOCUMENTS

| | | | |
|---|---|---|---|
| 2007/0230420 A1* | 10/2007 | Bumiller et al. | 370/338 |
| 2007/0280247 A1* | 12/2007 | Mera et al. | 370/392 |
| 2008/0072305 A1* | 3/2008 | Casado et al. | 726/11 |
| 2008/0091518 A1* | 4/2008 | Eisenson et al. | 705/10 |
| 2008/0140848 A1* | 6/2008 | Christenson | 709/228 |
| 2009/0210271 A1* | 8/2009 | Abrams | 705/7 |
| 2009/0249480 A1 | 10/2009 | Osipkov et al. | |
| 2009/0282022 A1* | 11/2009 | Bennett | 707/5 |
| 2010/0057739 A1* | 3/2010 | Charka et al. | 707/7 |
| 2010/0151816 A1* | 6/2010 | Besehanic et al. | 455/405 |
| 2010/0211996 A1* | 8/2010 | McGeehan et al. | 726/4 |
| 2010/0291950 A1* | 11/2010 | Lin et al. | 455/456.3 |
| 2010/0317371 A1* | 12/2010 | Westerinen et al. | 455/456.6 |
| 2011/0029383 A1* | 2/2011 | Engel et al. | 705/14.53 |
| 2011/0029385 A1* | 2/2011 | Engel et al. | 705/14.53 |
| 2011/0082824 A1* | 4/2011 | Allison et al. | 706/20 |
| 2011/0153423 A1* | 6/2011 | Elvekrog et al. | 705/14.53 |
| 2011/0172909 A1* | 7/2011 | Kahn et al. | 701/202 |
| 2011/0184981 A1* | 7/2011 | Lu et al. | 707/774 |
| 2011/0247045 A1* | 10/2011 | Rajagopal et al. | 726/1 |
| 2011/0264523 A1* | 10/2011 | Scott et al. | 705/14.52 |
| 2011/0270685 A1* | 11/2011 | Marks et al. | 705/14.66 |
| 2011/0276401 A1* | 11/2011 | Knowles et al. | 705/14.58 |
| 2011/0289186 A1* | 11/2011 | Bell et al. | 709/217 |
| 2012/0023190 A1* | 1/2012 | Backholm et al. | 709/217 |
| 2012/0040604 A1* | 2/2012 | Amidon et al. | 455/3.05 |
| 2012/0059713 A1* | 3/2012 | Galas et al. | 705/14.49 |
| 2012/0079104 A1* | 3/2012 | Casado et al. | 709/224 |
| 2012/0095841 A1* | 4/2012 | Luckerman et al. | 705/14.66 |
| 2012/0204262 A1* | 8/2012 | Thomas et al. | 726/23 |

OTHER PUBLICATIONS

Agarwal, et al., "Volley Automated Data Placement for GeoDistributed Cloud Services", Retrieved at << http://research.microsoft.com/en-us/people/sagarwal/nsdi2010.pdf >>, Jul. 20, 2010, pp. 16.

"Quova", Retrieved at << http://www.quova.com/ >>, Jul. 23, 2010, pp. 5.

Casado, et al., "Peering Through the Shroud: The Effect of Edge Opacity on IP-Based Client Identification, NSDI 2007", Retrieved at << http://www.cs.princeton.edu/~mfreed/docs/illum-nsdi07.pdf >>, Apr. 2007, pp. 14.

Pitsillidis, et al., "How to tell an airport from a Home : Techniques and Applications", Retrieved at << http://cseweb.ucsd.edu/~apitsill/papers/hotnets10.pdf >>, Oct. 20-21, 2010, pp. 6.

"National Household Travel Survey ", Retrieved at << http://nhts.ornl.gov/ >>, Oct. 18, 2010, p. 1.

"Navizon virtual GPS service", Retrieved at << http://www.navizon.com/ >>, Oct. 19, 2010, p. 1.

"Skyhook", Retrieved at << http://www.skyhookwireless.com/ >>, Oct. 18, 2010, p. 1.

Cheng, et al., "SmartSiren: Virus Detection and Alert for Smartphones", Retrieved at << http://citeseerx.ist.psu.edu/viewdoc/download?doi=10.1.1.125.6033&rep=rep1&type=pdf >>, Jun. 11-14, 2007, pp. 14.

Dischinger, et al., "Characterizing Residential Broadband Networks", Retrieved at << http://citeseerx.ist.psu.edu/viewdoc/download?doi=10.1.1.65.6825&rep=rep1&type=pdf >>, Oct. 24-26, 2007, pp. 14.

Eriksson, et al. "A Learning-based Approach for IP Geolocation", Retrieved at << http://nowak.ece.wisc.edu/geoloc1.pdf >>, pp. 10.

Hao, et al., "Detecting Spammers with SNARE: Spatio-temporal Network-level Automatic Reputation Engine", Retrieved at << http://www.cc.gatech.edu/~feamster/papers/snare-usenix09.pdf >>, pp. 17.

Padmanabhan, et al., "An Investigation of Geographic Mapping Techniques for Internet Hosts", Retrieved at << http://conferences.sigcomm.org/sigcomm/2001/p14-pabmanabhan.pdf >>, Aug. 27-31, 2001, pp. 13.

Trestian, et al., "Unconstrained Endpoint Profiling (Googling the Internet)", Retrieved at << http://networks.cs.northwestern.edu/publications/googling.pdf >>, Aug. 17-22, 2008, pp. 12.

Wong, et al., "Octant: A Comprehensive Framework for the Geolocalization of Internet Hosts", Retrieved at << http://www.usenix.org/events/nsdi07/tech/full_papers/wong/wong.pdf >>, pp. 313-326.

Xie, et al., "De-anonymizing the Internet Using Unreliable IDs", Retrieved at << http://citeseerx.ist.psu.edu/viewdoc/download?doi=10.1.1.150.4356&rep=rep1&type=pdf >>, Aug. 17-21, 2009, pp. 75-86.

Xie, et al., "How Dynamic are IP Addresses?", Retrieved at << http://ccr.sigcomm.org/drupal/files/fp179-xie.pdf >>, Aug. 27-31, 2007, pp. 12.

* cited by examiner

AUTOMATIC IDENTIFICATION OF TRAVEL AND NON-TRAVEL NETWORK ADDRESSES

BACKGROUND

Designers of Internet services increasingly seek to specialize their behavior and content to reflect contextual differences among their users to exploit location, differences in connection bandwidth, browser capabilities, whether a user is known, etc. Internet services increasingly are using geolocation to specialize their content and service provisioning for each user. Much of the location-based information is derived from identifiers such as IP (Internet Protocol) addresses. For example, a given user might access an Internet service from different locations, such as a home, a business location, a hotel on a business trip, or a cafe. While current geolocation tools can map each of these accesses to city-level positions, the context of these positions is unknown. In other words, the location information does not provide any meaning to these locations with respect to the users.

SUMMARY

A system automatically classifies groups of IP addresses associated with a user into location-based categories particular to the user. For example, the IP address categories may include home, travel and work locations. For each user or host, home IP address ranges may be identified from log files associated with activities of the user or host. Home IP address ranges are IP addresses that are regularly used by the user or host. Next, travel IP addresses are identified, which are IP addresses at locations greater than a predetermined distance from the home IP address ranges, as determined from geolocation data. To avoid inconsistencies in the classification, those addresses associated with proxies and virtual private networks (VPN) are pruned. An analysis may be performed to determine which of the home or travel IP addresses are actually work IP addresses associated with the user or host. From this location-based information about the user's or host's IP addresses, mobility patterns maybe derived, as well as applications to enhance security, advertising, search, and network management.

In accordance with some implementations, a method for classifying network addresses includes collecting and analyzing user event data in logs in response to user activity and determining non-travel network addresses as a first type of location information from the user event data. Travel network addresses may be determined as a second type of location information with respect to the non-travel network addresses by applying a distance parameter to geolocation location information.

In accordance with other implementations, a method for classifying network addresses associated with a user includes determining location information of the network addresses, and identifying candidate first locations from the location information. Second locations may be determined from the candidate first locations using a geographic parameter with respect to the location information, and based on patterns of use of the network addresses.

In accordance with yet other implementations, a method for classifying network addresses includes determining location information of the network addresses and identifying candidate network addresses using the location information of the network addresses. Non-travel network addresses and travel network addresses may be identified using the candidate network addresses and a distance parameter.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, these embodiments are not limited to the specific methods and instrumentalities disclosed. In the drawings.

DETAILED DESCRIPTION

The present disclosure describes systems and methods for classifying a type of location a particular IP address represents with respect to a user or host. The type of location may be determined from mobility patterns of the users who operate at the locations. For example, address ranges from which the same users appear consistently are more likely to be residences or workplaces ("home" IP addresses or "work" IP addresses), while address ranges that source a large number of distinct users who are not repeatedly seen are more likely to represent Internet infrastructure for transient users at e.g., airports, cafes, or hotels. A user who normally operates out of a home IP address, but is later determined as sending requests from a different IP address range in a location that is, e.g., hundreds of miles away, can be inferred to be traveling and using a "travel" IP address.

Such classification of IP addresses provides information on the user population and the context of their communications. From the classification information, user interests or intentions can be derived when the users access online services, such as search or news portals. From a network utilization perspective, decisions may be made regarding data caching and replication policies. From a security perspective, different security policies may be implemented for travel IP addresses and home IP addresses, as they show different security-related properties. From an advertising perspective, targeted advertising may be sent to travel IP addresses, as travelers may be more interested in, e.g., restaurants than plumbers, etc.

Figure 1:
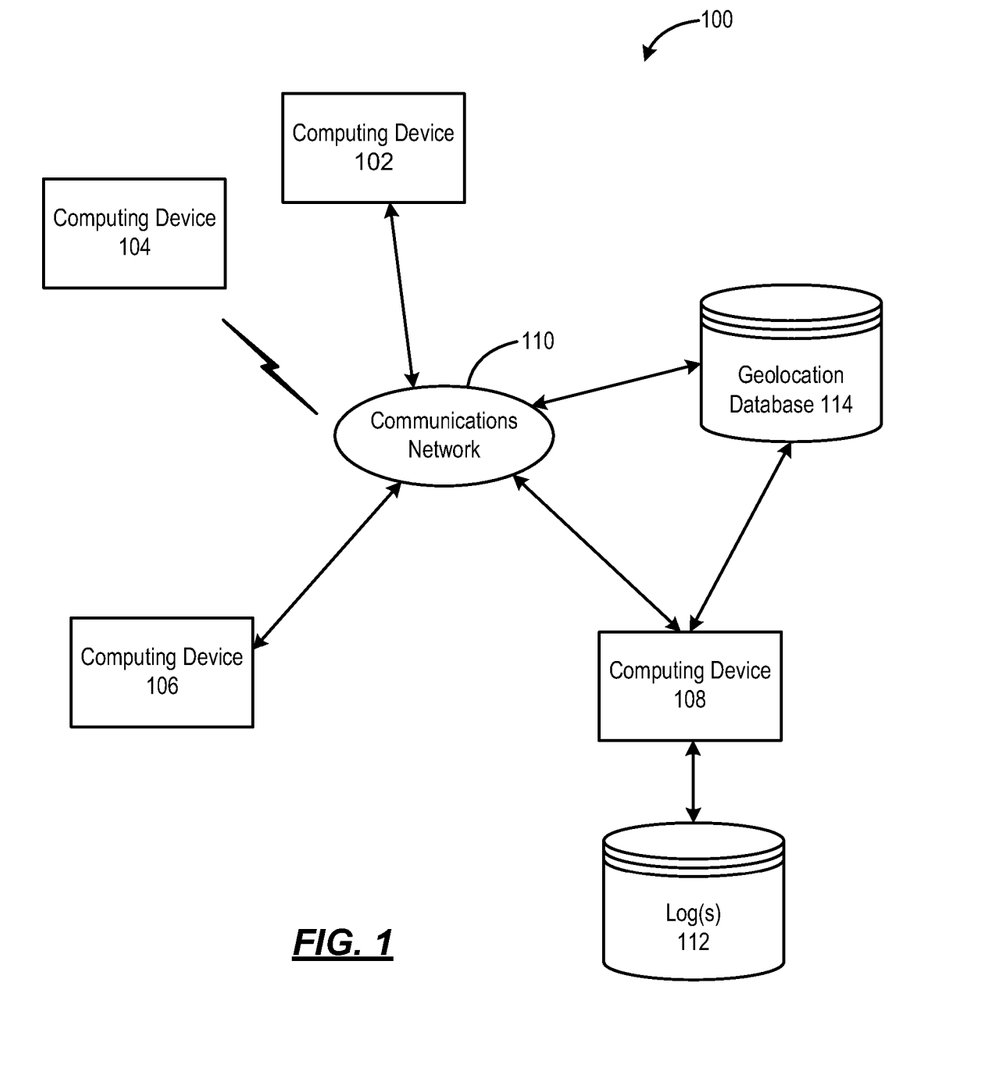
FIG. 1 illustrates an exemplary networked computing environment in which processes of the present disclosure may be implemented.

Referring to FIG. 1, there is illustrated is an exemplary networked computing environment 100 in which processes of the present disclosure may be implemented. The networked computing environment 100 may include one or more computing devices 102, 104, 106 and 108, one or more log(s) 112, and a geolocation database 114 that communicate over a communications network 110. The geolocation database 114 may be connected to another computing device, which is connected to the communications network 110. Each of the computing devices 102, 104, 108, 106 may make use of programs, methods, data stores, programmable logic, etc., to implement their associated functionalities. Each computing device 102, 104, 106 and 108 may also contain discrete functional program modules that might make use of an API (application programming interface), or other object, software, firmware and/or hardware, to request services of one or more of the other computing devices 102, 104, 106 and 108, log(s) 112 and geolocation database 114. The computing devices 102, 104, 106 and 108 may span portions of the same or different devices, and may comprise devices such as personal data assistants (PDAs), audio/video devices, MP3 players, personal computers, mobile-connected devices, servers, data centers, etc.

The communications network 110 may support various infrastructures to enable network topologies such as client/server, peer-to-peer, or hybrid architectures. The computing devices 102, 104, 106 and 108 may communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., the computing devices 102, 104, 106 and 108 may be coupled to one another via wired or wireless TCP/IP connection(s).

For example, any device connected to the communications network 110 may contact another device, such as computing device 108 as part of an e-mail service login process, software update process, etc. Information about the contacting device or user may be stored in the log(s) 112, such as an IP address of the contacting computing device (e.g., one of computing devices 102, 104 and 106), device-specific information, a user identifier, etc. Other details of the contacting computing device may be stored, such as an operating system or version. As described below in further detail, the information stored in the log(s) 112 may be used to classify the locations from which the user or device connects to the communications network 110.

The geolocation database 114 maintains geographic and network connection information about assigned and allocated IP addresses on the Internet. Querying the geolocation database 114 by an IP address may return a location, confidence assessment, or network intelligence information. An example of the geolocation database 114 may be products and services provided by Quova Corporation, Mountain View, Calif.

Figure 2:
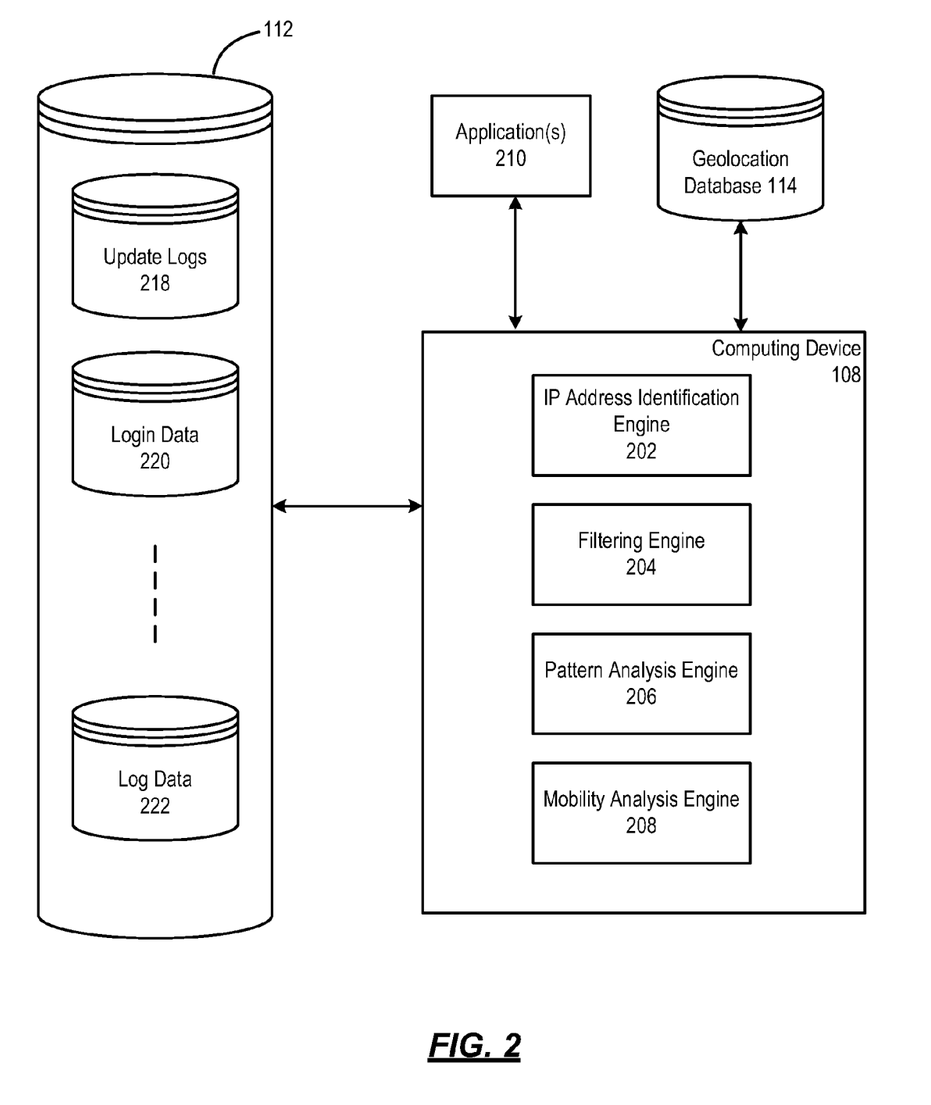
FIG. 2 illustrates exemplary elements within that computing environment of FIG. 1 that may be used to automatically identify and classify IP addresses based on user mobility patterns.

FIG. 2 illustrates exemplary elements within that computing environment 100 that may be used to automatically identify and classify IP addresses based on user mobility patterns. Computing device 108 may be a single device, or multiple computing devices that operate as part of a distributed infrastructure. The computing device 108 may be associated with a service provider, software vendor, online merchant, security provider, etc., and maintain the log(s) 112, which may include update logs 218, login data 220 and/or other log data 222 associated with the services offered by the computing device 108. For example, the update logs 218 may include a set of update events associated software updates for deployed software packages, such as operating systems and application software. The login data 220 may comprise user login events where information about the contacting computing device and/or user is collected. The log data 112 may comprise any type of data that is logged in response to events. The data in the update logs 218, login data 220 or other log data 222 may include host or user IDs, IP addresses, and time stamps, for example.

In accordance with some implementations, to classify IP addresses for each user or host, an IP address identification engine 202 may categorize IP addresses using geolocation data provided by the geolocation database 114, which provides a mapping of IP addresses to geolocation. Distances between events logged in the log(s) 112 may be determined by calculating the geographic distance of the corresponding IP addresses. The IP address identification engine 202 may infer IP addresses of home locations (i.e., home IP addresses) associated with the user or host without any prior knowledge of user travel activities. As described below, this information may be used for the subsequent inference of IP addresses used at work places (i.e., work IP addresses) and those used at travel locations (i.e., travel IP addresses).

In an implementation, the process may begin by identifying home IP addresses, which are those typically those associated with users in their general home city and/or metropolitan area. Dynamic Host Configuration Protocol (DHCP) IP address allocation and local travel may result in home IP addresses changing frequently. However, the IP address identification engine 202 accounts for the differing IP addresses, as they remain in approximately the same location both topologically and geographically.

For each IP address associated with a user or host, a Border Gateway Protocol (BGP) prefix of the IP address as well as its geographic location (city and state names) are stored as a <BGP, Location> pair, in an implementation. For example, IP address range information could be derived from BGP tables or the whois database. The locations accessed by the user or host may be identified by counting a number of days a given <BGP, Location> pair appears in the log(s) 112. In some implementations, a sliding window of, e.g., 30 days may be advanced in increments of, e.g., one week to determine if a predetermined number of active days at the IP address is observed. For example, if at least 15 (or other number) active days are observed within such a window, the particular <BGP, Location> pair may be defined as a candidate home location IP address. The threshold number of active days provides a level of confidence that a particular IP address is a candidate. The process may be repeated for all IP addresses associated with the user or host to identify the candidate home IP addresses for that particular user or host. Any sliding window size and increment size may be used, depending on the implementation.

After obtaining the candidate home IP addresses, the IP address identification engine 202 identifies the travel IP addresses. For example, for each event that occurred more than a predetermined distance from the user's or host's home location (e.g., 250 miles), the IP address identification engine 202 considers the IP address associated with an event in the log(s) 112 to be a candidate travel IP address for that user or host. The distance may be smaller or greater than 250 miles and is used as an amount where it is likely that events occurring outside this distance are related to travel activity.

With the candidate home IP addresses and travel IP addresses identified, a filtering engine 204 filters the addresses to remove proxy and/or VPN IP addresses. Proxy and VPN IP addresses may introduce false geolocation information, as the user may not be in the same geolocation as a proxy or VPN server associated with these IP addresses. For example, social networking sites may automatically log users into email accounts. Such login events correspond to the IP addresses of the social networking site, not the user. To identify these IP addresses, a distance per time metric, such as a "miles per hour" (mph) metric or a meters per second metric, for example, may be applied to two IP addresses that were used consecutively in time by a user or host. The mph metric is prefaced on an assumption that a user's physical travel speed has an upper bound (e.g., 500 mph, a typical commercial airplane speed). For example, if a transition between the geolocation of a candidate home IP address and the next event associated with a travel IP address is faster than the upper bound, then it is very likely that no physical travel is actually involved and the travel IP address is removed, as it likely corresponds to a VPN or proxy server. In some implementations, that same VPN or proxy server IP address may have been identified as a home IP address by a second host, thus it is also removed from that set. Any travel IP address information obtained by that second host is also removed, since the home IP address information may not be valid because of the differing classifications.

The filtering engine 204 may also resolve inconsistencies between the candidate home IP address set and the travel IP address set. The inconsistencies may arise when different users result in the same IP address as being tagged into different categories. Such inconsistencies could arise for a variety of reasons. For example, IP addresses can have inaccurate geolocation information and it may be inherently difficult to pinpoint their locations (e.g., satellite IP addresses). In addition, inferences based on individual user activities may create inaccuracies. For example, the IP address identification engine 202 may misclassify the home and travel addresses for a user who travels to a location for an extended period of time.

To increase the confidence level of the classification, for each IP address the filtering engine 204 examines the user population P associated with the IP address, and examines the degree of consensus on its classification among P. In some implementations, a decision process may examine if (1) at least two users in P consistently tag this IP address as a home (or travel) IP; and if (2) more than half of its population P all tag this IP address in the same way. If so, the initial classification is deemed to be accurate by the filtering engine 204. Otherwise, the filtering engine 204 may prune the IP address and the corresponding ranges (from the BGP table) from the final home (or travel) IP address set. The filtering engine 204 may prune all such IP addresses and their entire ranges from the home IP set. Thus, the output of the filtering engine 204 is a final set of candidate home IP addresses and a set of travel IP addresses.

A pattern analysis engine 206 may receive the final candidate home IP addresses and identify those addresses within the set that are actually home IP addresses and those that are work IP addresses. Thus, the pattern analysis engine 206 may differentiate IP addresses used at workplaces from those used at home residences. In some implementations, to distinguish workplace IP addresses from those at home residences, a diurnal analysis may be performed, as work IP addresses tend to be used during only workdays, while home addresses are mostly used at night and during weekends. The pattern analysis engine 206 may utilize the patterns of use of the IP addresses, as the patterns tend to be cyclical. The pattern analysis engine 206 may, for example, distinguish a user's daily commute patterns by their request/network-access timestamps. Other types of analysis may be utilized that analyze the patterns of usage.

In some implementations, to perform the analysis, a selection of candidate home IP address pairs may be made that are (1) from different BGP ranges and (2) both accessed on a single day. For the corresponding IP address pairs, if such daily access patterns repeat for more than one day for example, then the pattern analysis engine 206 may tag the address that has been active for at least 6 days out of a 7-day window as a home IP address. The pattern analysis engine 206 may classify the other IP range as a work IP address. Thus, from the candidate home IP addresses, the pattern analysis engine 206 outputs a set of actual home IP addresses and a set of work IP addresses.

Having derived the home, work, and travel IP address sets, applications may be developed to use this information from the IP addresses and to perform operations based on the IP addresses. For example, mobility patterns can be derived from the classifications by a mobility analysis engine 208. By determining home IP addresses, a mobility analysis engine 208 may determine a concept of a home location to examine long-term mobility trends as users change their home locations over long time spans. An analysis of long-term mobility can provide a global view of a user population for tasks such as resource provisioning and location-based feature planning. The mobility analysis engine 208 may develop short-term user mobility trends that arise from when users travel and return to their home locations. Such short-term travel patterns are useful for applications that would benefit from user population profiles, e.g., targeted advertisement.

In accordance with implementations of the present disclosure, because inferences are made at the IP-address level, application(s) 210 can take advantage of this information to process requests from users or remote hosts. For example, home and travel IP addresses may have different security properties, where traveling hosts may be more vulnerable to attacks. For example, empirical data shows that malicious login events are 20 times higher at travel IP addresses than those at home IP addresses, suggesting access from travel IP addresses should operate under more stringent security policies. Moreover, the larger percentage of malicious login events at travel locations also suggests there might exist other types of malicious activities on those hosts, such as spreading attacks and compromising more computers. Thus, machines at travel IP addresses may be more vulnerable than home computers. Because travel IP addresses are shared much more frequently, directly blacklisting them may have higher false positive rates. On the other hand, attackers may prefer choosing travel locations to launch their attacks because of the denser user population. Thus, different defense strategies may be provided at travel locations.

Furthermore, the different security properties of travel and home IP addresses suggest techniques for detecting the use of compromised accounts by attackers and other similar fraudulent activity. For example, user-login events from several new IP addresses within a few hours seem more likely to be benign if these addresses are at travel locations than if they are in residences. In the former case, the user may simply be traveling; in the latter case, the events may be from bots that employ the user's account for sending spam.

The classification of home and travel IP addresses also provides an opportunity for online applications to understand user profiles. Based on the location categories of a user, user interests or intentions may be inferred to customize search results and to target advertisement. For example, travel-related links may have higher rankings when the query comes from a travel IP address.

Data migration and caching policies can benefit from categorization of IP addresses. First, user actions can be better predicted with IP address information. For example, users typically spend just a few hours at the airport, while they could spend days at hotels, and years at new home locations. Based on the prediction, certain ones of the application(s) 210 can decide whether users' data should be migrated permanently or cached in the travel places. Second, caching strategies can be made based on IP properties. For example, data can be cached on both home and work locations, rather than migrating data back and forth. Thus, the application(s) 210 may provide many enhanced features because of the classification of the IP addresses.

Figure 3:
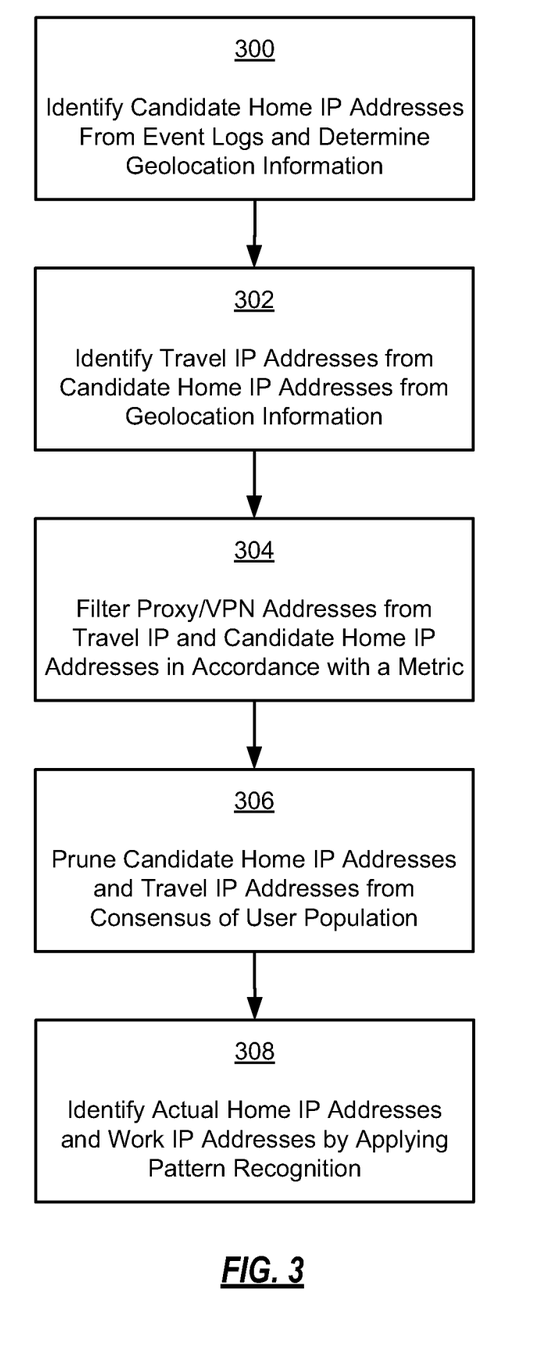
FIG. 3 illustrates an operational flow diagram of exemplary processes that are performed to automatically classify IP addresses.

FIG. 3 illustrates an operational flow diagram of exemplary processes that are performed to automatically classify IP addresses. At 300, home IP addresses are identified. The IP address identification engine 202 may categorize IP addresses using data provided by the geolocation database 114. The home IP addresses may be locations that are identified by counting a number of days a given <BGP, Location> pair appears in the trace and applying a window to determine if the particular pair is a home location candidate.

At 302, travel IP addresses are identified. The IP address identification engine 202 may identify travel IP addresses after having obtained the home IP address and applying a geographic distance to the home IP address, as it is likely that related events occurring outside the distance is related to travel activity. At 304, proxy/VPN addresses are filtered. The filtering engine 204 may filter the IP addresses to remove proxy and/or VPN IP addresses, as these types of addresses introduce false IP address geolocation information to derive candidate sets.

At 306, the candidate home IP addresses and the travel IP addresses are pruned. The filtering engine 204 may also resolve inconsistencies between candidate home IP and travel IP addresses. For each IP address, the filtering engine 204 examines the user population associated with the IP address, and examines the degree of consensus on its classification among the population. If there is no consensus regarding an IP address, the filtering engine 204 may prune all the IP addresses and their entire ranges from the home IP set to derive a set of home IP address candidates and a set of travel IP addresses.

At 308, work IP addresses are determined. The pattern analysis engine 206 may receive the home IP address candidates and then identify those addresses that are actually home IP addresses and those that are work IP addresses. The pattern analysis engine 206 may differentiate IP addresses used at workplaces from those used at home residences by applying a diurnal analysis to the IP addresses. The pattern analysis engine 206 outputs a set of actual home IP addresses and a set of work IP addresses.

Thus, as described above, systems and methods are provided to classify IP addresses based on user mobility patterns. From the patterns, applications may be developed to enhance network planning, security, advertising, etc.

Aspects of the subject matter may be implemented in the general context of computer-executable instructions, such as program modules, being executed by a computer. Generally, program modules include routines, programs, objects, components, data structures, etc. that perform particular tasks or implement particular abstract data types. Aspects of the subject matter may also be practiced in distributed computing environments where tasks are performed by remote processing devices that are linked through a communications network. In a distributed computing environment, program modules may be located in both local and remote computer storage media, including memory storage devices.

Figure 4:
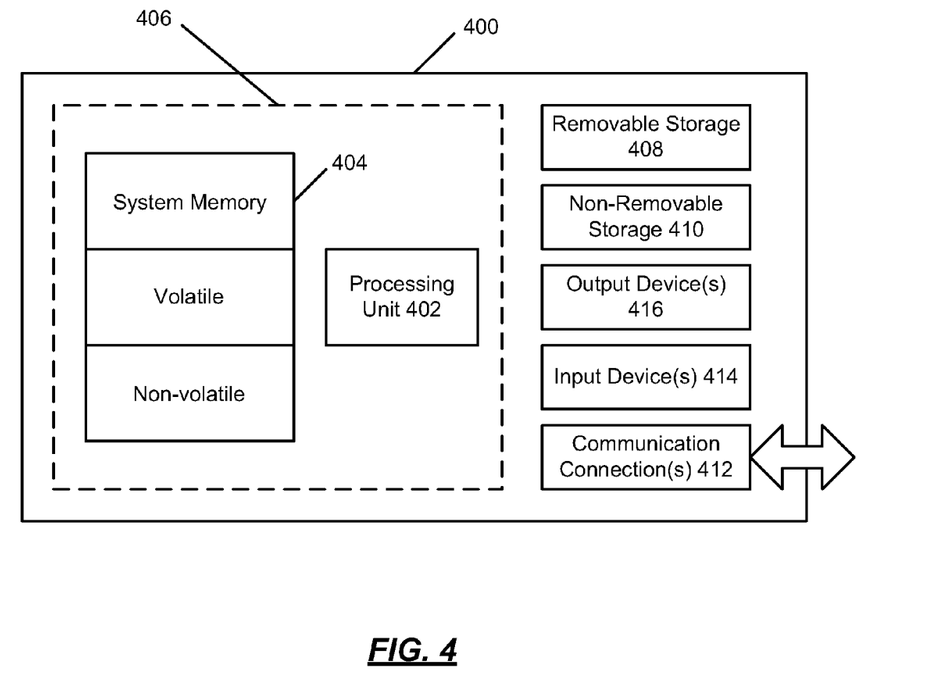
FIG. 4 shows an exemplary computing environment.

FIG. 4 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer readable media. Computer readable media can be any available media that can be accessed by device 400 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may contain communications connection(s) 412 that allow the device to communicate with other devices. Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for classifying network addresses, comprising:
    collecting and analyzing user event data in logs in response to user activity;
    determining non-travel network addresses as a first type of location information from the user event data;
    determining travel network addresses as a second type of location information with respect to the non-travel network addresses by applying a distance parameter to geolocation location information; and
    determining a network address, of the non-travel network addresses and the travel network addresses, that is a virtual private network (VPN) address or a proxy address based on a metric by applying the metric to two network addresses to determine that a user did not physically travel between locations specified by the two network addresses, wherein the determined network address is one of the two addresses.

2. The method of claim 1, wherein the non-travel network addresses comprise home network addresses and work network addresses.

3. The method of claim 2, further comprising:
    determining multiple types of location information of the network addresses, including the travel network addresses, the home network addresses, and the work network addresses, using the user event data, comprising:
        determining the home network addresses from the non-travel network addresses; and
        determining the work network addresses as a third type of location information from the home network addresses by analyzing usage patterns of the network addresses.

4. The method of claim 3, wherein the first type of location information is home Internet Protocol (IP) addresses associated with the user, the second type of location information is travel IP addresses associated with the user, and the third type of location information is work IP addresses associated with the user.

5. The method of claim 4, wherein the distance parameter is applied to the home IP addresses to determine the travel IP addresses.

6. The method of claim 1, wherein the user event data comprises one of a user identifier, a machine identifier, a network address, or a time stamp associated with an event.

7. The method of claim 1, further comprising determining the first type of location information by applying a sliding window of time to each network address to determine if each network address is used by the user above a frequency threshold.

8. The method of claim 1, wherein network addresses associated with proxy servers or virtual private network (VPN) servers are removed from the first type of location information and the second type of location information.

9. The method of claim 8, wherein determining the network address, of the non-travel network addresses and the travel network addresses, that is a virtual private network (VPN) address or a proxy address based on a metric by applying the metric to two network addresses to determine that the user did not physically travel between locations specified by the two network addresses comprises:
    identifying the two network addresses used consecutively in time associated with the user, where one network address of the two network addresses has been identified as the second type of location information;
    applying the metric to the two network addresses to determine that the user did not physically travel between locations specified by the two network addresses consecutive in time; and
    identifying one of the two network addresses as a virtual private network (VPN) or a proxy address.

10. The method of claim 1, wherein the metric is a distance per time metric.

11. The method of claim 1, further comprising:
    determining a mobility pattern of a user and the first and second types of location information; and
    providing applications based on the first and second types of location information and the mobility pattern.

12. The method of claim 11, wherein the applications comprise security applications that apply predetermined policies based on whether a network address associated with the user is a home network address, a travel network address, or a work network address.

13. The method of claim 11, wherein the applications comprise targeted advertising that is provided to the user based on whether a network address associated with the user is a home network address, a travel network address, or a work network address.

14. The method of claim 11, wherein the applications comprise data migration and caching policies that migrate or cache data associated with the user based on whether a network address associated with the user is a home network address, a travel network address, or a work network address.

15. A method for classifying network addresses, comprising:
    determining location information of the network addresses;
    identifying candidate network addresses using the location information of the network addresses;
    filtering network addresses from the candidate network addresses that are associated with proxy servers or virtual private network (VPN) servers based on a metric by applying the metric to two network addresses to determine that a user did not physically travel between locations specified by the two network addresses, and removing one of the two addresses from the candidate network addresses; and identifying non-travel network addresses and travel network addresses using the filtered candidate network addresses and a distance parameter.

16. The method of claim 15, further comprising:

identifying candidate home network addresses using the location information of the network addresses;

identifying travel network addresses using the candidate home network addresses by applying a distance parameter to geolocation location information; and determining work network addresses from the candidate home network addresses by analyzing usage patterns of the network addresses.

17. A method for classifying network addresses associated with a user, comprising:

determining location information of the network addresses;

identifying candidate first locations from the location information;

determining second locations from the candidate first locations using a geographic parameter with respect to the location information, and based on patterns of use of the network addresses; and filtering locations from the first and second locations that are associated with proxy servers or virtual private network (VPN) servers based on a metric by applying the metric to two locations of the first and second locations to determine that the user did not physically travel between the two locations, and removing one of the two locations from either the first or the second locations.

18. The method of claim 17, wherein the first locations are home network addresses, and the second locations comprise at least one of travel network addresses or work network addresses.

19. The method of claim 18, wherein the candidate first locations are candidate home Internet Protocol (IP) addresses associated with the user, and the second locations comprise at least one of travel IP addresses associated with the user or work IP addresses associated with the user.

20. The method of claim 18, wherein the parameter is a distance parameter applied to the candidate first locations to determine the travel network addresses, and further comprising determining the candidate first locations by applying a window of time to each network address to determine if each network address is used by the user for a threshold amount of time.

\* \* \* \* \*